No. 787,822.

Patented April 18, 1905.

UNITED STATES PATENT OFFICE.

MATTHEW SYDNEY BELL, OF MAYFAIR, NEAR JOHANNESBURG, TRANSVAAL.

ANTI-INCRUSTATION FLUID.

SPECIFICATION forming part of Letters Patent No. 787,822, dated April 18, 1905.

Application filed February 23, 1905. Serial No. 246,899.

*To all whom it may concern:*

Be it known that I, MATTHEW SYDNEY BELL, a subject of the King of Great Britain, residing at Mayfair, near Johannesburg, Transvaal, have invented a certain new and useful Improved Anti-Incrustation Fluid for Steam-Boilers, of which the following is a specification.

This invention relates to an anti-incrustation fluid for steam-boilers or to a fluid intended for preventing the deposition of scale or incrustation on the interior of the boiler-plates or internal fittings of steam-boilers which results from the introduction of calcareous salts or other impurities through the medium of the feed-water.

By the use of my improved fluid the boiler may be kept in a thoroughly clean state and the highest efficiency obtained in its working.

The invention consists, essentially, of a fluid obtained by boiling together the following substances or materials—namely, black treacle, wattle-bark, shreds or shavings of leather, licorice-root, and caustic soda—in suitable quantities or proportions.

In order that my invention may be more fully understood, I will now describe the mode or method of manufacturing a given quantity.

In order to produce, say, forty gallons of the fluid, I employ the several substances or materials in the following quantities or proportions, more or less: black treacle, twenty pounds; wattle-bark, ten pounds; shreds or shavings of leather, five pounds; licorice-root, two pounds; caustic soda, fifteen pounds. These several materials are placed in a vessel of suitable capacity, in which forty-two gallons or thereabout of water has been placed. The water is then raised to boiling-point and allowed to boil slowly for a period of five hours or thereabout. The resulting liquid or solution is then drawn off and is ready for use. It is preferably introduced into the steam-boiler along with the feed-water in suitable quantities and at suitable intervals of time, according to the condition of the boiler and the nature of the impurities contained in the feed-water.

The black treacle, wattle-bark, licorice-root, and caustic soda are the ordinary articles of commerce sold under these names. The leather (skins of animals which have been tanned) is cut into shreds or shavings before being placed in the vessel, and the other ingredients are used in their ordinary commercial form or state.

What I claim as my invention, and desire to protect by Letters Patent, is—

1. An anti-incrustation fluid for steam-boilers produced by boiling in water black treacle, wattle-bark, leather (tanned skins of animals) licorice-root and caustic soda in suitable quantities or proportions.

2. An anti-incrustation fluid for steam-boilers produced by boiling in water black treacle, wattle-bark, shreds or shavings of leather, licorice-root and caustic soda substantially in the proportions hereinbefore specified.

3. An anti-incrustation fluid for steam-boilers produced by boiling slowly in water thirty-eight and six-thirteenths percentum black treacle, nineteen and three-thirteenths per cent. wattle-bark, nine and eight-thirteenths per cent. shreds or shavings of leather, three and eleven-thirteenths per cent. licorice-root and twenty-eight and eleven-thirteenths per cent. of caustic soda, substantially as described.

In witness whereof I have hereunto set my hand in the presence of two subscribing witnesses.

MATTHEW SYDNEY BELL.

Witnesses:
 CHAS. OVENDALE,
 R. OVENDALE.